United States Patent
Kalaichelvan et al.

(10) Patent No.: US 11,595,734 B2
(45) Date of Patent: Feb. 28, 2023

(54) TECHNOLOGIES FOR PROVIDING STREAM METADATA TO CLIENTS

(71) Applicant: ARRIS Enterprises LLC, Suwanee, GA (US)

(72) Inventors: Kaliraj Kalaichelvan, San Diego, CA (US); Mark Schmidt, San Diego, CA (US); William P. Franks, San Diego, CA (US)

(73) Assignee: ARRIS Enterprises LLC, Suwanee, GA (US)

(*) Notice: Subject to any disclaimer, the term of this patent is extended or adjusted under 35 U.S.C. 154(b) by 22 days.

(21) Appl. No.: 17/405,074

(22) Filed: Aug. 18, 2021

(65) Prior Publication Data

US 2022/0078526 A1  Mar. 10, 2022

Related U.S. Application Data

(60) Provisional application No. 63/076,696, filed on Sep. 10, 2020.

(51) Int. Cl.
*H04N 21/643* (2011.01)
*H04L 12/28* (2006.01)
*H04L 65/65* (2022.01)
*H04L 65/70* (2022.01)
*H04L 65/75* (2022.01)

(52) U.S. Cl.
CPC ....... *H04N 21/643* (2013.01); *H04L 12/2807* (2013.01); *H04L 12/2809* (2013.01); *H04L 12/2812* (2013.01); *H04L 65/65* (2022.05); *H04L 65/70* (2022.05); *H04L 65/75* (2022.05)

(58) Field of Classification Search
None
See application file for complete search history.

(56) References Cited

U.S. PATENT DOCUMENTS

| | | | |
|---|---|---|---|
| 2012/0243469 A1* | 9/2012 | Klein | H04L 65/1026 370/328 |
| 2014/0040498 A1* | 2/2014 | Oyman | H04L 41/0836 709/231 |
| 2016/0099787 A1* | 4/2016 | Jackson | H04N 21/812 725/19 |

* cited by examiner

*Primary Examiner* — Jeffrey R Swearingen
(74) *Attorney, Agent, or Firm* — Panitch Schwarze Belisaro & Nadel LLC (57) ABSTRACT

Technologies are disclosed for providing stream media content and/or metadata indicating stream media content. A media control device may receive a Digital Living Network Alliance (DLNA) hypertext transport protocol (HTTP) request from a media content device. The DLNA HTTP request may have a header created by the media content device. The media control device may interpret the DLNA HTTP request header. A first metadata may be identified in the DLNA HTTP request header that may indicate a request for stream media content information. The media control device may send a DLNA HTTP response to the media content device. The DLNA HTTP response may have a header that may include a second metadata indicating the stream media content information. The second metadata may include information enabling construction of a HTTP Live Streaming (HLS) master playlist, a program map table, and/or a program association table associated with the stream media content.

21 Claims, 5 Drawing Sheets

TECHNOLOGIES FOR PROVIDING STREAM METADATA TO CLIENTS

BACKGROUND

Media content may be provided by a plurality of media content network operators to home and/or business subscribers/viewers. Media content network operators (e.g., cable network operators, or satellite operators, etc.) may provide subscribers/viewers with various forms of media content, such as movies, concerts, premium media content, broadcast media content, and/or pay-per-view (PPV) media content, and/or the like.

At times, user may view media content at a device, such as a mobile/wireless device (e.g., a cellphone, and/or a tablet, etc.) while connected to a home and/or private communication network. One or more communication standards/protocols may facilitate the interconnection of the wireless device and the home communication network. For example, using such communication standards/protocols, the user may view streamed media content provided by another device on the communication network.

One such communication standard/protocol is provided by the Digital Living Network Alliance (DLNA). DLNA uses universal plug-and-play techniques to facilitate communication among communication network devices (e.g., set-top boxes, televisions, etc.), mobile devices in communication with the network (e.g., smartphone, tablets, etc.), and network infrastructure devices (e.g., routers, etc.).

SUMMARY

Technologies are disclosed for providing stream media content and/or metadata indicating stream media content. A media control device may receive a Digital Living Network Alliance (DLNA) hypertext transport protocol (HTTP) request from a media content device. The DLNA HTTP request may have a header, perhaps for example created by the media content device. The media control device may interpret the DLNA HTTP request header. A first metadata may be identified in the DLNA HTTP request header. The first metadata may indicate a request for stream media content information. The media control device may send a DLNA HTTP response to the media content device. The DLNA HTTP response may have a header that may include a second metadata indicating the stream media content information. The second metadata may include information enabling construction of a HTTP Live Streaming (HLS) master playlist, a program map table (PMT), and/or a program association table (PAT) associated with the stream media content.

In one or more scenarios, the second metadata may include the stream media content information in base64 format. In one or more scenarios, the DLNA HTTP response header may be provided as at least part of a programinfo.dlna.org parameter, for example. In one or more scenarios, the DLNA HTTP request header may be provided as at least a getprograminfo.dlna.org parameter, for example.

BRIEF DESCRIPTION OF DRAWINGS

The elements and other features, advantages and disclosures contained herein, and the manner of attaining them, will become apparent and the present disclosure will be better understood by reference to the following description of various examples of the present disclosure taken in conjunction with the accompanying drawings, wherein.

DETAILED DESCRIPTION

For the purposes of promoting an understanding of the principles of the present disclosure, reference will now be made to the examples illustrated in the drawings, and specific language will be used to describe the same. It will nevertheless be understood that no limitation of the scope of this disclosure is thereby intended.

Figure 1:
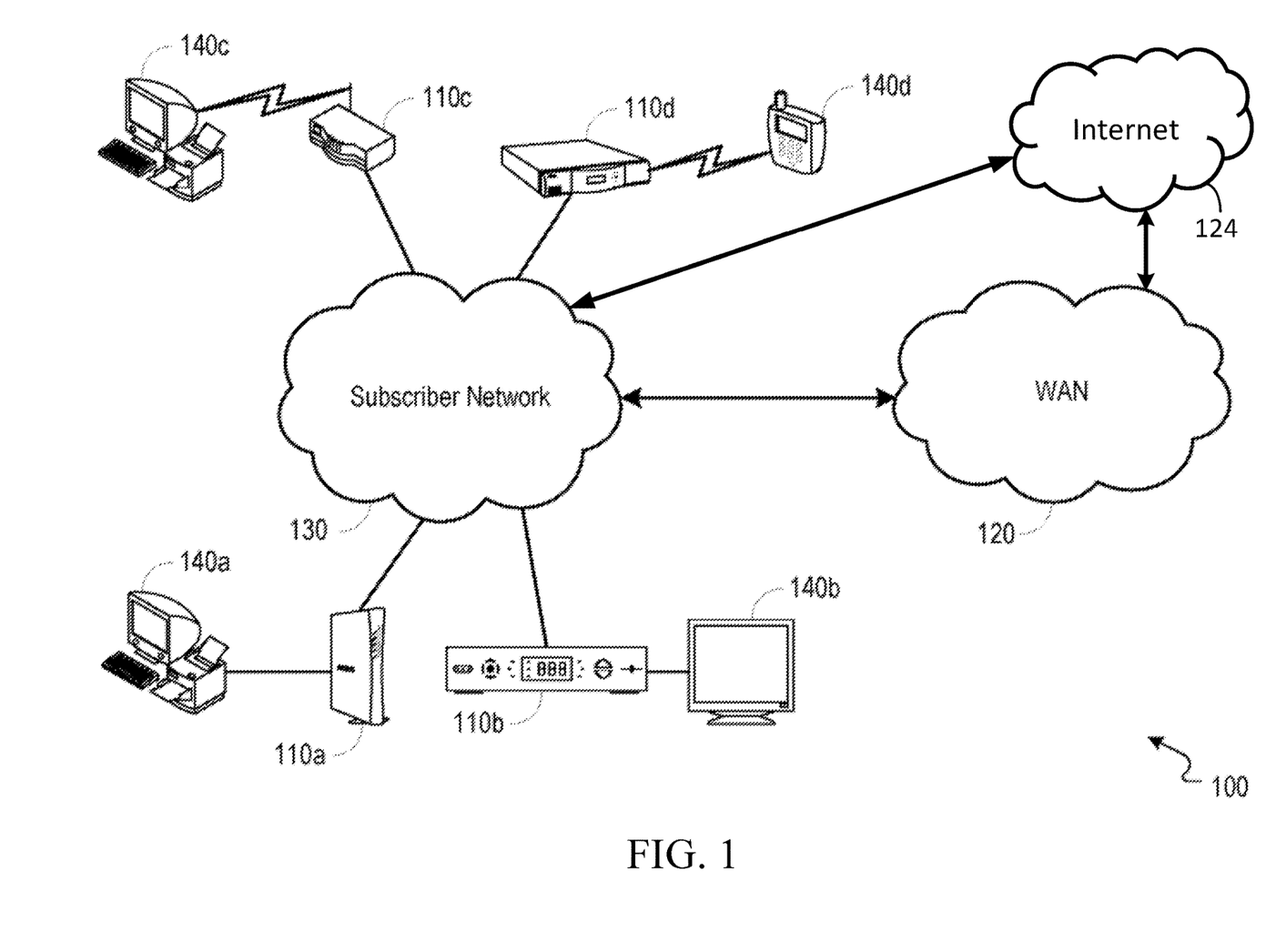
FIG. 1 is a block diagram illustrating an example network environment operable to deliver video and/or audio content throughout the network via one or more network devices, such as a consumer premises device (CPE) device, among other devices.

FIG. 1 is a block diagram illustrating an example network environment 100 operable for a media content delivery network operator, or MSO, to deliver media content to subscribers/viewers. Media content may be provided via a consumer premise equipment (CPE) and/or network gateway device supported by the MSO, for example. In one or more scenarios, CPE devices 110a-d receive video service(s) and/or data service(s) from a wide area network (WAN) 120 via a connection to a subscriber network 130. The one or more nodes of subscriber network 130 and/or the WAN 120 may communicate with one or more cloud-based nodes (not shown) via the Internet 124. The subscriber network 130 and/or WAN 120 may include a home gateway (not shown), that may be used to implement set-top box functionality, among other functions.

The CPE devices can include, for example, a modem 110a, a set-top box 110b, a wireless router including an embedded modem 110c, or a media gateway 110d, among many others (e.g., digital subscriber line (DSL) modem, voice over internet protocol (VOIP) terminal adapter, video game console, digital versatile disc (DVD) player, communications device, hotspot device, etc.). The subscriber network 130, for example, can be a hybrid fiber-coaxial (HFC) network, a local area network (LAN), a wireless local area network (WLAN), a cellular network, a personal area network (PAN), as well as others.

The CPE devices can facilitate communications between the WAN 120 and client devices 140a-d. A cable modem or embedded MTA (eMTA) 110 *a* can facilitate communications between the WAN 120 and a computer 140a. A set-top box 110b can facilitate communications between the WAN 120 and a television/monitor 140b (e.g., a media presentation device) and/or a digital video recorder (DVR). A wireless router 110c can facilitate communications between a computer 140c and the WAN 120. The media gateway 110d can facilitate communications between a mobile device 140d (e.g., a tablet computing device, a smartphone, a personal digital assistant (PDA) device, a laptop computing device, etc.; one or more devices being PC-based, iOS-based, tvOS-based, Linux-based, and/or Android-based, etc.) and the WAN 120.

A user (not shown) may view stream media content on the mobile device 140d, for example. For various reasons, the user may seek to obtain a play list of available stream media content, for example from the set-top box 110b, the media gateway 110d, the television 140b, and/or a home gateway (not shown), among other devices. The user may request play list information for stream media content using one or more communication protocols/standards such as, but not limited to, AirPlay, Chromecast, Digital Living Network Alliance (DLNA), and/or Discovery and Launch (DIAL), among other protocols.

The WAN network 120 and/or the subscriber network 130 may be implemented as any type of wired and/or wireless network, including a local area network (LAN), a wide area network (WAN), a global network (the Internet), etc. Accordingly, the WAN network 120 and/or the subscriber network 130 may include one or more communicatively coupled network computing devices (not shown) for facilitating the flow and/or processing of network communication traffic via a series of wired and/or wireless interconnects. Such network computing devices may include, but are not limited, to one or more access points, routers, switches, servers, compute devices, storage devices, etc.

Figure 2:
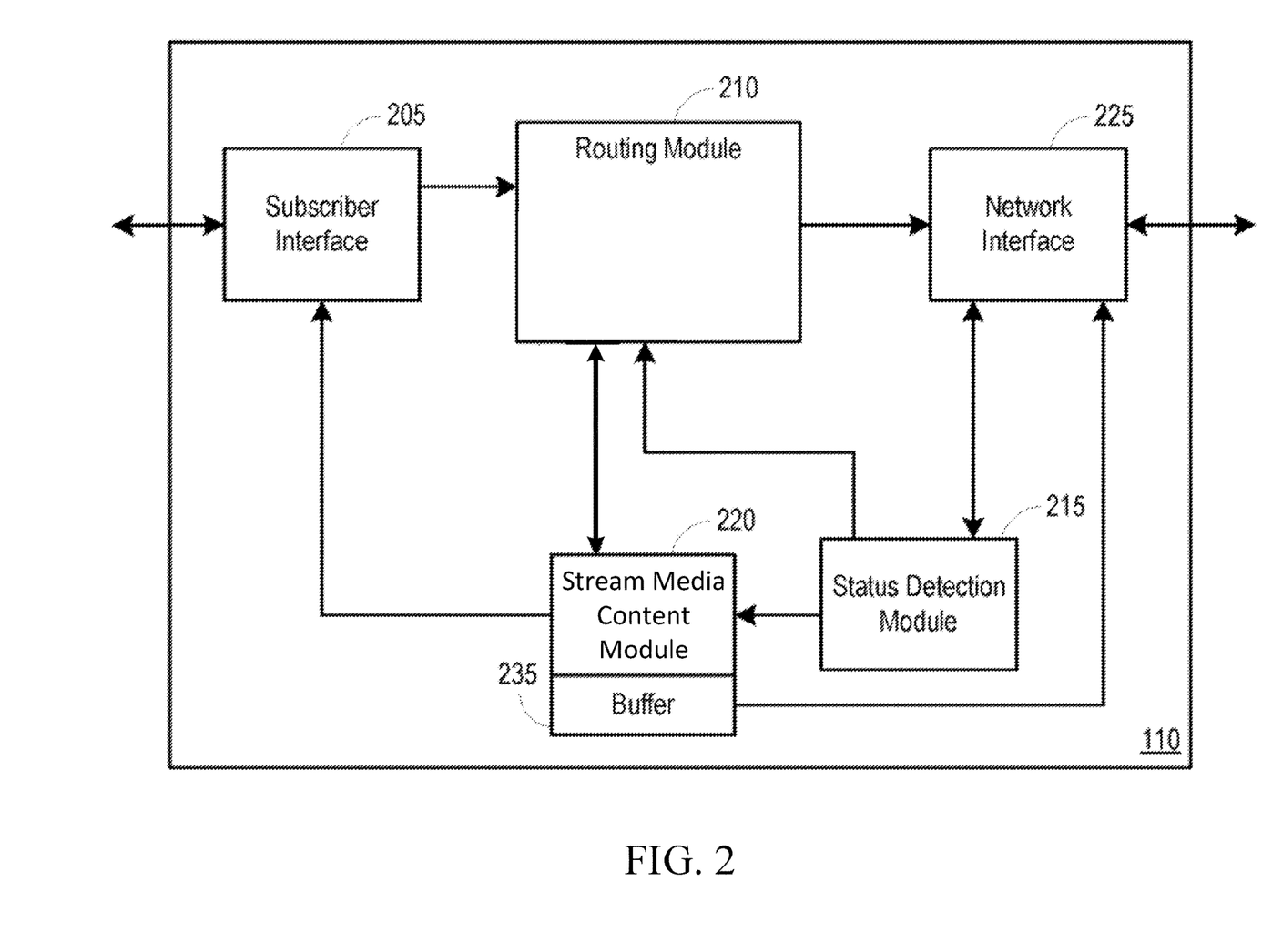
FIG. 2 is a block diagram illustrating an example CPE device of FIG. 1 that may be configured to deliver video and/or audio content to a subscriber.

FIG. 2 is a block diagram illustrating an example CPE device 110 operable to output audio/visual media content to one or more devices, such as for example, the television/monitor 140b. The CPE device 110 can include a subscriber interface 205, a routing module 210, a status detection module 215, a stream media content module 220, and/or a network interface 225.

In one or more scenarios, the CPE device 110 may receive a communication from a subscriber or subscriber device (e.g., subscriber device 140a-d of FIG. 1). For example, the communication can be a request for data or a service from a network (e.g., WAN 120 of FIG. 1). A communication received from a subscriber or subscriber device can be received as a resource identifier (e.g., URL, and/or an IP address, and/or other format).

In one or more scenarios, a routing module 210 may route a received communication to a network interface 225. The routing module 210 may route the communication to the network interface 225. The routing module may translate the received communication from a URL to an IP address.

At times, a user who may be interested in streaming media content on a media content device (e.g., a mobile device 140d) may wish to obtain information regarding stream media content, for example from a communication network device (e.g., set-top box 110b, television 140b, and/or media gateway 110d, etc.).

For example, the user may use the mobile device 140d to communicate with set-top box 110b to obtain information regarding stream media content. In one or more scenarios, the set-top box 110b may communicate such information via DLNA standard/protocol compliant communication formats. Absent at least sufficient compliance on the part of the mobile device 140d with the DLNA standard/protocol, the mobile device 140d might not successfully obtain the stream media content information/metadata from the set-top box 110b.

Apple iOS-based and/or tvOS-based devices, perhaps among others, might not be fully compliant with DLNA. In other words, the user of an iOS-based and/or tvOS-based mobile device may not successfully obtain the stream media content from the set-top box 110b.

In one or more scenarios, DLNA may be a standard protocol to stream video over wired and/or wireless mediums to smart media devices (e.g., mobile device 140d). One or more client devices might not at least fully support DLNA and/or might not be a part of the DLNA alliance (e.g., iOS-based and/or tvOS-based devices). One or more applications may be placed on such at least non-fully compliant DLNA devices that could translate a DLNA stream to a protocol/format that may be supported (e.g., natively) by such non-fully compliant DLNA devices. Such translation applications may require the processing overhead on the client device to decrypt and/or inspect (e.g., deeply inspect) the DLNA stream for metadata/information, perhaps for example for playback, for service acquisition, and/or to obtain closed caption listing, etc.

In one or more scenarios, the media control device may be a compliant DLNA device, perhaps for example with Digital Transmission Content Protection (DTCP) serving the Digital Rights Management (DRM) function for the media content that may be served to iOS-based and/or tvOS-based media content devices (e.g., iPhones, iPads, Apple-TVs, etc.), for example. In one or more scenarios, the media control device may serve similar content to Android and/or Linux media content devices which may support DLNA/DTCP, for example.

One or more iOS-based and/or tvOS-based clients may (e.g., natively) support Hypertext Transfer Protocol (HTTP) Live Streaming (HLS) as the streaming protocol for a media playback by its player. The software development kit (SDK) on iOS-based and/or tvOS-based client/devices may consume the DLNA stream and/or may converts it into an HLS stream for playback. The DTCP DRM may be carried over/converted into HLS, perhaps for example to reduce the complexity and/or overhead of re-encryption and/or to protect the media content. Such a conversion may require a close (e.g., deep) inspection of the decrypted media stream to determine the metadata/information that may be useful to construct the HLS playlist. Such inspection may add to the complexity and/or overhead for playback in iOS-based and/or tvOS-based devices, for example.

It may be useful to provide capabilities, techniques, methods, and/or devices that may allow devices with operating systems that might not be at least fully compatible with DLNA (e.g., iOS-based devices, tvOS-based devices, etc.) to communicate with DLNA compatible devices to, among other things, obtain information/metadata about stream media content (e.g., a play list for available stream media content, etc.).

One or more techniques described herein include stream metadata/information may be attached/included as part of DLNA headers, perhaps for example in base64 format, among other formats. Such metadata/information could be used by at least non-fully compliant DLNA devices, perhaps for example for better and/or faster playback/streaming solutions. In one or more scenarios, iOS-based and/or tvOS-based devices/clients may find the techniques described herein useful. In one or more scenarios, non-iOS-based and/or non-tvOS-based devices/clients may find the techniques described herein useful, perhaps for example to improve streaming performance and/or quality, etc.

In one or more scenarios, the stream media content module 220 of a media control device (e.g., a media control device, such as a set-top box, a television, and/or a home gateway, among other devices) may receive inquiries regarding stream media content, perhaps for example from a media content device (e.g., a mobile device).

For example, the stream media content module 220 of the media control device may receive a DLNA HTTP request from a media content device. The DLNA HTTP request may have a header created by/at the media content device. Table 1 illustrates an example DLNA HTTP request header.

TABLE 1

Example DLNA HTTP Request Header

HEAD/GET <request>
Host: 192.168.1.101:7878
Content-Length: 0
getContentFeatures.dlna.org: 1
getprograminfo.dlna.org: 1
Connection: keep-alive
Accept: */*
Accept-Language: en-us
Accept-Encoding: gzip, deflate The stream media content module 220 may interpret the DLNA HTTP request header. In the interpretation, the stream media content module 220 may identify a (e.g., first) metadata in the DLNA HTTP request header. The first metadata may indicate a request for stream media content information. For example, as illustrated in Table 1, the parameter "getprograminfo.dlna.org" may be added to the DLNA HTTP request header to indicate interest in stream media content metadata/information.

The stream media content module 220 may send a DLNA HTTP response to the media content device. The DLNA HTTP response may have a header. The DLNA HTTP response header may include (e.g., a second) metadata indicating the stream media content information. Table 2 illustrates an example DLNA HTTP response header.

TABLE 2

Example DLNA HTTP Response Header

HTTP Response:
HTTP/1.1 200 OK
Server: KreaTV HTTP Media Server
Connection: close
Date: Thu, 01 Jan 1970 00:09:24 GMT
Cache-Control: no-cache
Pragma: no-cache
Content-Type: application/x-dtcp1;DTCP1HOST=192.168.1.101;DTCP1PORT=7880;CONTENTFORMAT=video/mpeg
contentFeatures.dlna.org:
DLNA.ORG_PN=DTCP_MPEG_TS_SD_NA_ISO;DLNA.ORG_OP=10;DLNA.ORG_PS=-64,-32,-16,-8,-4,-2,
-1,-7/8,-3/4,-5/8,-1/2,-3/8,-1/4,
-1/8,1/8,1/4,3/8,1/2,5/8,3/4,7/8,2,4,8,16,32,64;DLNA.ORG_FLAGS=01710000000000000000000000000
000
programinfo.dlna.org:
R0AAEQAAsA1aMMEAAAAD4HZ9uYE9////////////////////////////////////////////////////////
////////////////////////////////////////////////////////////////////////////////////
///////////////////////////////////9HQHYRAAKwMgADwQAA9ArwBogE/w/9/BvOCvAPhg3iZW5nfj//
ZW5nwT//D/QL8AYKBGVuZwCWejTO///////////////////////////////////////////////////////
/////////////////////////////////////////////////////////////////////////////////w==

As illustrated in Table 2, the parameter "programinfo.dlna.org" may be added to the DLNA HTTP response header to indicate the presence of stream media content metadata and/or information. In one or more scenarios, a program map table (PMT) and/or a program association table (PAT) may be associated/supplied with the stream media content in the DLNA HTTP response header. In one or more scenarios, the PAT and/or the PMT of the media stream may be encoded to base64 and/or may be supplied as at least a part of the programinfo.dlna.org parameter, for example.

In one or more scenarios, the media content device (e.g., an iOS-based client, a tvOS-based client, etc.) could parse the DLNA HTTP response header, perhaps for example to identify the metadata/information (e.g., CC: ClosedCaptions, etc.) for HTTP Live Streaming (HLS) master playlist construction, among other reasons. Table 3 illustrates an example HLS master playlist.

TABLE 3

Example HLS Master Playlist

HLS Master Playlist:
EXTM3U
EXT-X-VERSION:7
EXT-X-MEDIA:TYPE=CLOSED-CAPTIONS,GROUP-ID="cc",NAME="CC1_eng",LANGUAGE="eng",INSTREAM-ID="CC1"
EXT-X-MEDIA:TYPE=CLOSED-CAPTIONS,GROUP-ID="cc",NAME="SERVICE1_eng",LANGUAGE="eng",INSTREAM-ID="SERVICE1"
EXT-X-STREAM-INF:BANDWIDTH=4000000,CLOSED-CAPTIONS="cc"
smmfr://127.0.0.1/index.m3u8

In one or more scenarios, such parsing of the DLNA HTTP response header may significantly reduce (e.g., effectively eliminate) media stream decryption and/or deep inspection. In one or more scenarios, the decoded base64 could be used as an EXT-X-MAP in one or more HLS variant playlists, perhaps for example to enable faster service acquisition. In one or more scenarios, perhaps for example when the media stream itself may be played, the media content device (e.g., via a SDK) may send an HTTP "GET" request to the media control device with an uniform resource identifier (URI) of the content stream that may be dynamically created (e.g., adaptive transcoding) and/or may be sent to the media content device, for example.

In one or more scenarios, Hypertext Transfer Protocol (HTTP) messages may be communicated according to one or more communication protocol standards such as AirPlay, Chromecast, Digital Living Network Alliance (DLNA), and/or Discovery and Launch (DIAL), among others.

The routing module 210 can route communications, requests, determinations, and/or detections of stream media content to/from the stream media content module 220. For example, the routing module 210 can translate the communications, requests, determinations, and/or detections of stream media content into and/or with an address (e.g., IP address) associated with the stream media content module 220. The status detection module 215 may monitor the network connection status of the CPE device 110.

The status detection module 215 may determine the status of the network connection for the CPE device 110. The status detection module 215 can monitor the network connection of the CPE device 110 through the network interface 225. The status detection module 215 can monitor one or more various components that are associated with the network connection for the CPE device 110. For example, the status detection module 215 can monitor one or more hardware components (e.g., internal hardware components of the CPE device 110, connection cables such as radio frequency cables, phone lines, digital subscriber lines, etc.) that are used in the connection of the CPE device 110 to a network. This may include physical status detection (e.g., physical mapping to signal). If no signal is detected, a physical component may be broken (e.g., broken line or disconnected plug, etc.). A prompt can instruct a subscriber to check an associated connector or line.

The status detection module 215 can monitor the status of the network and/or data link layer associated with the CPE device 110. For example, the status detection module 215 can monitor the CPE device's connection to a host server (e.g., dynamic host configuration protocol server) and/or the status of configuration information received from the host server. For example, the status detection module 215 can monitor the CPE device's connection to a packet routing server (e.g., a point-to-point protocol PPP server) and/or subscriber credentials such as a username and password associated with the packet routing server. Data link layer status may include failed (synchronization failure), connected, on-doing (synchronizing), and others. In response to a failure, a re-scan for a cable line and/or retraining for DSL line may be attempted.

The communications, requests, determinations, and/or detections of the stream media content may be transmitted and/or stored in one or more files, such as text files (e.g., Hypertext Transfer Protocol (HTTP) files), among other type of files, and via one or more communication protocol standards, such as, but not limited to, the Digital Living Network Alliance (DLNA).

The CPE device 110 may store one or more, or multiple, files that may be ordered (e.g., hierarchically according to a specific order) for carrying out one or more actions in the setup of a device (e.g., set-top box 110*b*). The media content forwarding module 220 may include a buffer 235. The buffer 235 can store a subscriber communication (e.g., URL or IP address received from the subscriber) and/or the communications, requests, determinations, and/or detections of stream media content. In one or more scenarios, perhaps for example when the status detection module 215 determines that a network connection issue might no longer exist, the buffer 235 can output the subscriber communication and/or the communications, requests, determinations, and/or detections of stream media content through the network interface 225.

In one or more scenarios, the stream media content may include one or more of over-the-top (OTT) video, cable video, broadcast video, and/or satellite video, among other types of video content.

Figure 3:
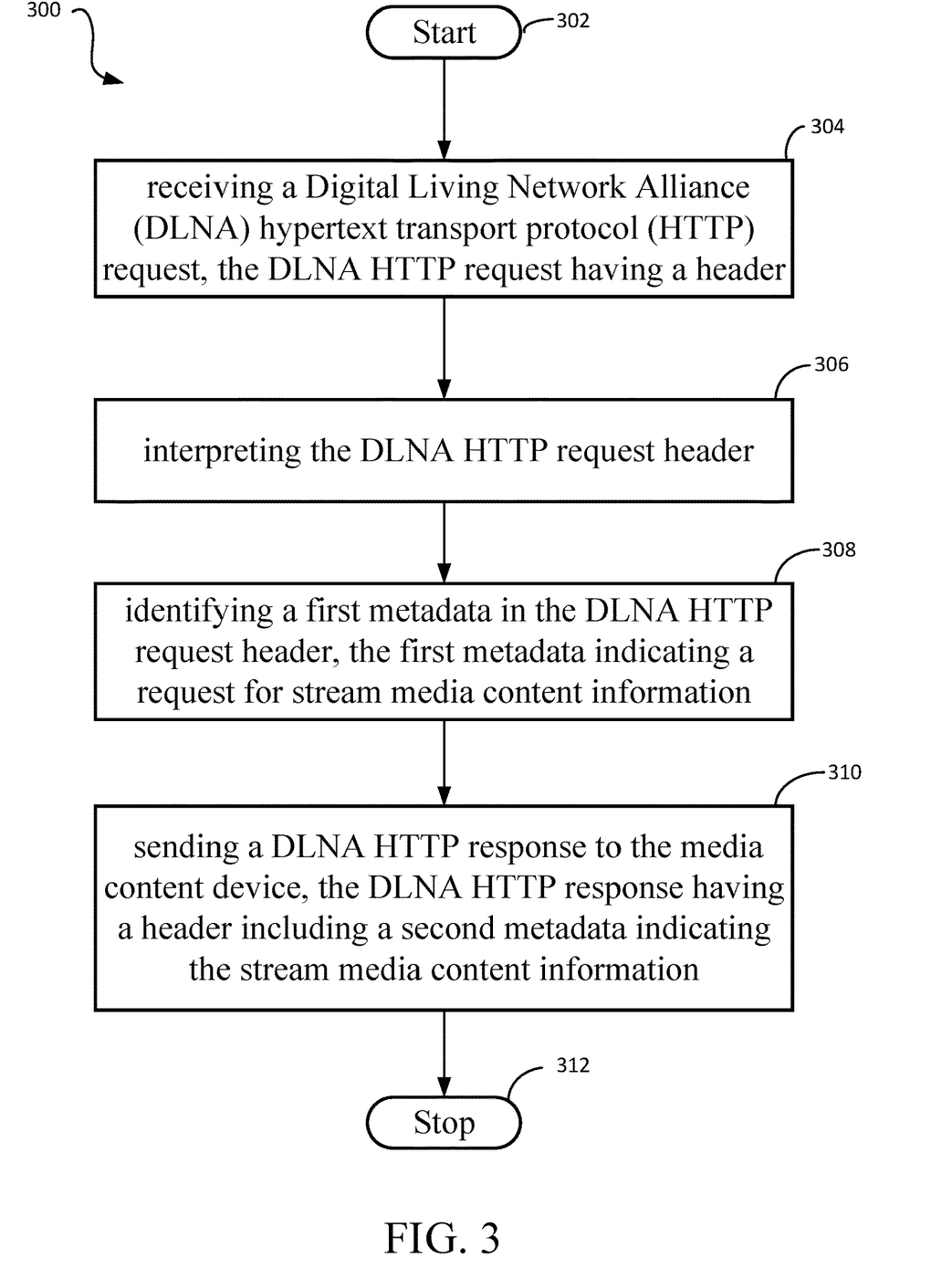
FIG. 3 is an example flow diagram of at least one technique for providing media content that may include media content orientation changes.

Referring now to FIG. 3, an example method 300 illustrates a technique for providing stream media content performed by a media control device. At 302, the process may start. At 304, the media control device may receive a Digital Living Network Alliance (DLNA) hypertext transport protocol (HTTP) request from a media content device. The DLNA HTTP request may have a header, perhaps for example created by the media content device.

At 306, the media control device may interpret the DLNA HTTP request header. At 308, the media control device may identify a first metadata in the DLNA HTTP request header. The first metadata may indicate a request for stream media content information.

At 310, the media control device may send a DLNA HTTP response to the media content device. The DLNA HTTP response may have a header. The DLNA HTTP response header may include a second metadata indicating the stream media content information.

At 312 the process may stop or restart. In one or more scenarios, the media control device may be a set-top box, a television, and/or a media (e.g., a home) gateway.

Figure 4:
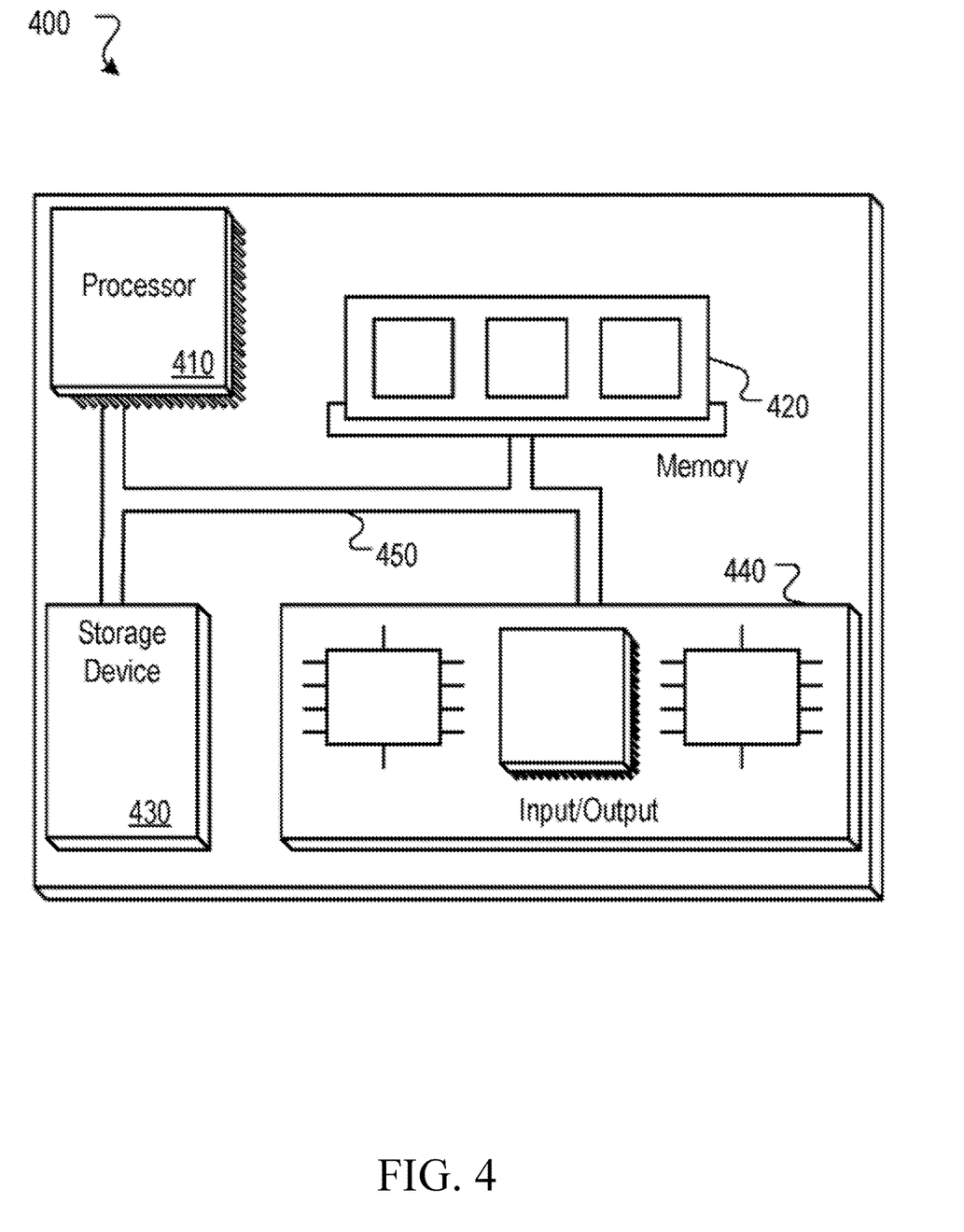
FIG. 4 is a block diagram of a hardware configuration of an example device that may deliver video and/or audio content, such as the CPE device of FIG. 2.

FIG. 4 is a block diagram of a hardware configuration of an example device that may deliver media content (e.g., video and/or audio content), such as the CPE device of FIG. 2. The hardware configuration 400 may be operable to facilitate delivery of information from an internal server of a device. The hardware configuration 400 can include a processor 410, a memory 420, a storage device 430, and/or an input/output device 440. One or more of the components 410, 420, 430, and 440 can, for example, be interconnected using a system bus 450. The processor 410 can process instructions for execution within the hardware configuration 400. The processor 410 can be a single-threaded processor or the processor 410 can be a multi-threaded processor. The processor 410 can be capable of processing instructions stored in the memory 420 and/or on the storage device 430.

The memory 420 can store information within the hardware configuration 400. The memory 420 can be a computer-readable medium (CRM), for example, a non-transitory CRM. The memory 420 can be a volatile memory unit. The memory 420 can be a non-volatile memory unit.

The storage device 430 can be capable of providing mass storage for the hardware configuration 400. The storage device 430 can be a computer-readable medium (CRM), for example, a non-transitory CRM. The storage device 430 can, for example, include a hard disk device, an optical disk device, flash memory and/or some other large capacity storage device. The storage device 430 can be a device external to the hardware configuration 400.

The input/output device 440 may provide input/output operations for the hardware configuration 400. The input/output device 440 (e.g., a transceiver device) can include one or more of a network interface device (e.g., an Ethernet card), a serial communication device (e.g., an RS-232 port), one or more universal serial bus (USB) interfaces (e.g., a USB 2.0 port) and/or a wireless interface device (e.g., an 802.11 card). The input/output device can include driver devices configured to send communications to, and receive communications from one or more networks (e.g., subscriber network 120 of FIG. 1).

Figure 5:
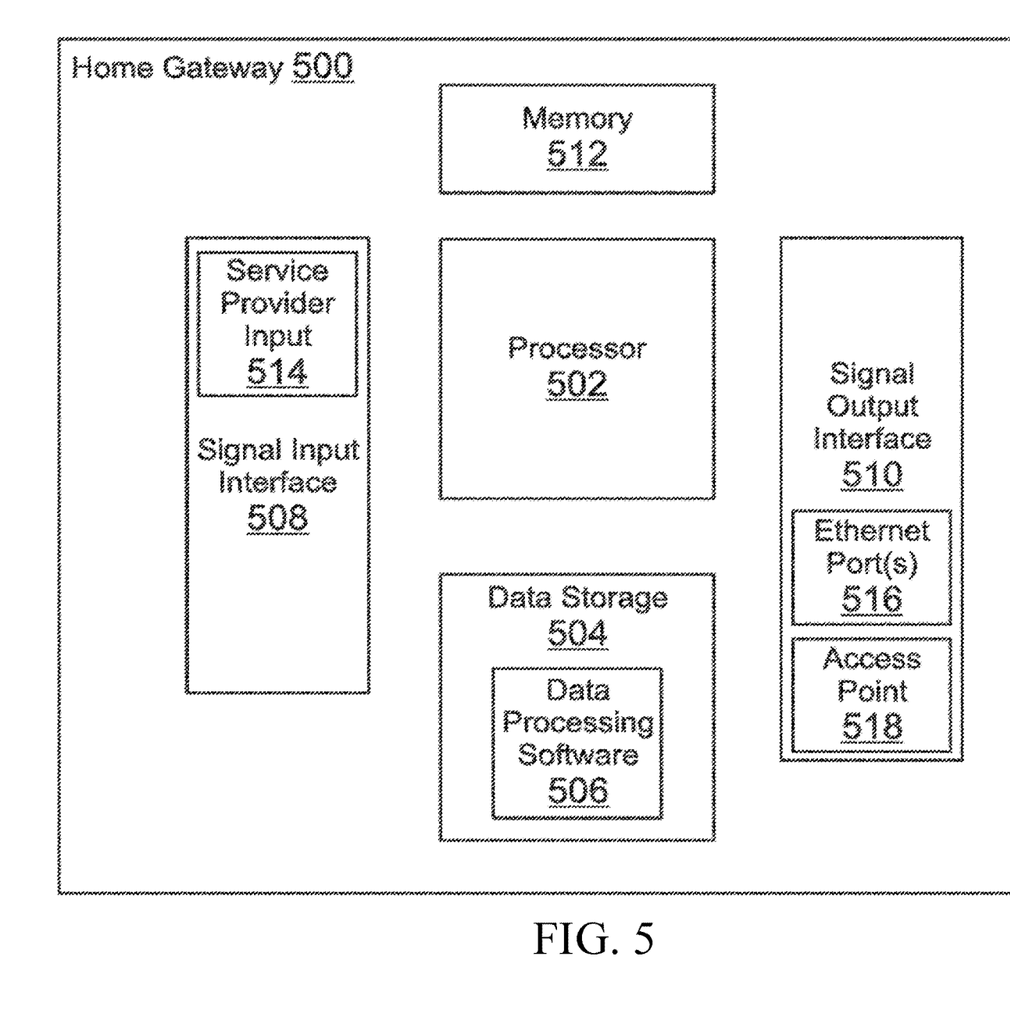
FIG. 5 is a block diagram of a hardware configuration of an example device that may deliver video and/or audio content, such as a home gateway.

FIG. 5 is a block diagram of a hardware configuration of an example device that may deliver media content (e.g., video and/or audio content), such as a home gateway. The home gateway 500 may be constructed in a similar manner to set-top box 400 in that the architecture may be built around a general-purpose processor, processor 502, and/or an application specific chip set such as designed for use in a Data Over Cable Service Interface Specification (DOCSIS), a Gigabit Passive Optical Network (GPON), and/or a Digital Subscriber Line (DSL) modem. As with processor 402, the general-purpose processor 502 may also be an off-the-shelf processor specifically programmed to carry out the functions described herein. The functionality of the desired modem may be implemented through data processing software 506 stored in data storage 504 and/or may be run on processor 502.

Home gateway 500 may include signal input interface 508 and/or signal output interface 510. Signal input interface 508 may include, for example, circuitry to receive data input from a service provider at service provider input 514, e.g., a cable and/or a fiber optic input.

Signal output interface 510 may provide the output of the home gateway 500. Signal output interface 510 may provide signals in formats for transmission over a datalink. For example, interface 510 may include one or more Ethernet ports 516 and/or a wireless access point 518. Data may be communicated over wired and/or wireless networks. The access point 518 may be located external to the home gateway 500. Video and/or audio content received at signal input interface 508 can be streamed from home gateway 500 to set top box 400, perhaps for example as another source of video and/or audio signal. This streaming may be accomplished over a reliable backhaul communication link (not shown) that may provide good video quality, perhaps for example for signals that are sensitive to latency in the signal (e.g., live programming). The signal input interface 508 and the signal output interface 510 may operate together, such as for example as a transceiver device.

In operation, a data signal may be received at signal input interface 508 of home gateway 500. Processor 502 may operate data processing software 506 on processor 502 to prepare the received signals (e.g., code, decode, etc.). The output of the data processing software 506 may be output by signal output interface 510, e.g., Ethernet port 516 and/or wireless access point 518.

Those skilled in the art will appreciate that the disclosed subject matter improves upon methods and/or apparatuses for enabling devices with operating systems that may at least not be fully compatible with DLNA to communicate with DLNA compatible devices to, among other things, obtain information/metadata about stream media content (e.g., a play list for available stream media content, etc.). This may be useful in one or more scenarios, for example with Apple iOS-based devices that might not be fully compatible with DLNA.

The subject matter of this disclosure, and components thereof, can be realized by instructions that upon execution cause one or more processing devices to carry out the processes and/or functions described herein. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. The subject matter described in this specification can be implemented as one or more computer program products, e.g., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and/or logic flows described in this specification may be performed by one or more programmable processors executing one or more computer programs to perform functions by operating on input data and/or generating output thereby tying the process to a particular machine (e.g., a machine programmed to perform the processes described herein). The processes and/or logic flows can also be performed by, and apparatus can also be implemented as, special purpose logic circuitry, e.g., an FPGA (field programmable gate array) and/or an ASIC (application specific integrated circuit).

Computer readable media suitable for storing computer program instructions and/or data include all forms of non-volatile memory, media and memory devices, including by way of example semiconductor memory devices (e.g., EPROM, EEPROM, and/or flash memory devices); magnetic disks (e.g., internal hard disks or removable disks); magneto optical disks; and/or CD ROM and DVD ROM disks. The processor and/or the memory can be supplemented by, or incorporated in, special purpose logic circuitry.

While this specification contains many specific implementation details, these should not be construed as limitations on the scope of any invention or of what may be claimed, but rather as descriptions of features that may be specific to described implementations. Certain features that are described in this specification in the context of separate implementations can also be implemented in combination in perhaps one implementation. Various features that are described in the context of perhaps one implementation can also be implemented in multiple combinations separately or in any suitable sub-combination. Although features may be described above as acting in certain combinations and perhaps even initially claimed as such, one or more features from a claimed combination can in some cases be excised from the combination, and the claimed combination may be directed to a sub-combination or variation of a sub-combination.

While operations may be depicted in the drawings in a particular order, this should not be understood as requiring that such operations be performed in the particular order shown or in sequential order, or that all illustrated operations be performed, to achieve desirable results. The described program components and/or systems can generally be integrated together in a single software product or packaged into multiple software products.

Examples of the subject matter described in this specification have been described. The actions recited in the claims can be performed in a different order and still achieve desirable results, unless expressly noted otherwise. For example, the processes depicted in the accompanying figures do not necessarily require the particular order shown, or sequential order, to achieve desirable results. Multitasking and parallel processing may be advantageous.

While the present disclosure has been illustrated and described in detail in the drawings and foregoing description, the same is to be considered as illustrative and not restrictive in character, it being understood that only certain examples have been shown and described, and that all changes and modifications that come within the spirit of the present disclosure are desired to be protected.

What is claimed is:

1. A method for providing stream media content performed by a media control device, the method comprising:
   receiving a Digital Living Network Alliance (DLNA) hypertext transport protocol (HTTP) request, by the media control device, from a media content device, the DLNA HTTP request having a header created by the media content device;
   interpreting the DLNA HTTP request header by the media control device;
   identifying, by the media control device, a first metadata in the DLNA HTTP request header, the first metadata indicating a request for stream media content information; and
   sending a DLNA HTTP response to the media content device, the DLNA HTTP response having a header, the DLNA HTTP response header including a second metadata indicating the stream media content information.

2. The method of claim 1, wherein the second metadata includes the stream media content information in base64 format.

3. The method of claim 1, wherein the second metadata includes the stream media content information regarding at least one of: a program map table (PMT) associated with the stream media content, or a program association table (PAT) associated with the stream media content.

4. The method of claim 1, wherein the DLNA HTTP response header is provided as at least part of a programinfo.dlna.org parameter.

5. The method of claim 1, wherein the DLNA HTTP request header is provided as at least a getprograminfo.dlna.org parameter.

6. The method of claim 1, wherein the second metadata includes information enabling construction of a HTTP Live Streaming (HLS) master playlist.

7. The method of claim 1, wherein the media content device is a mobile device, the mobile device being at least one of: an iOS-based tablet computing device, an iOS-based smartphone, an iOS-based personal digital assistant, a tvOS-based digital media player, or an iOS-based laptop computer.

8. The method of claim 1, wherein the media control device is at least one of: a set-top box, a home gateway, a television, or a personal computing device.

9. A media control device configured to provide stream media content, the device comprising:
   a memory;
   a transceiver; and
   a processor, the processor configured at least to:
      receive a Digital Living Network Alliance (DLNA) hypertext transport protocol (HTTP) request from a media content device, the DLNA HTTP request having a header created by the media content device;
      interpret the DLNA HTTP request header;
      identify a first metadata in the DLNA HTTP request header, the first metadata indicating a request for stream media content information; and
      send a DLNA HTTP response to the media content device, the DLNA HTTP response having a header, the DLNA HTTP response header including a second metadata indicating the stream media content information.

10. The device of claim 9, wherein the processor is further configured such that the second metadata includes the stream media content information in base64 format.

11. The device of claim 9, wherein the processor is further configured such that the second metadata includes the stream media content information regarding at least one of: a program map table (PMT) associated with the stream media content, or a program association table (PAT) associated with the stream media content.

12. The device of claim 9, wherein the processor is further configured such that the DLNA HTTP response header is provided as at least part of a programinfo.dlna.org parameter.

13. The device of claim 9, wherein the processor is further configured such that the DLNA HTTP request header is provided as at least a getprograminfo.dlna.org parameter.

14. The device of claim 9, wherein the processor is further configured such that the second metadata includes information enabling construction of a HTTP Live Streaming (HLS) master playlist.

15. The device of claim 9, wherein the media content device is a mobile device, the mobile device being at least one of: an iOS-based tablet computing device, an iOS-based smartphone, an iOS-based personal digital assistant, a tvOS-based digital media player, or an iOS-based laptop computer.

16. The device of claim 9, wherein the media control device is at least one of: a set-top box, a home gateway, a television, or a personal computing device.

17. A non-transitory computer readable medium having instructions stored thereon, the instructions causing at least one processor of a media control device to perform one or more operations, the one or more operations comprising at least:
   receiving a Digital Living Network Alliance (DLNA) hypertext transport protocol (HTTP) request from a media content device, the DLNA HTTP request having a header created by the media content device;
   interpreting the DLNA HTTP request header;
   identifying a first metadata in the DLNA HTTP request header, the first metadata indicating a request for stream media content information; and
   sending a DLNA HTTP response to the media content device, the DLNA HTTP response having a header, the DLNA HTTP response header including a second metadata indicating the stream media content information.

18. The non-transitory computer readable medium of claim 17, wherein the one or more operations for the sending a DLNA HTTP response cause the second metadata to include the stream media content information regarding at least one of: a program map table (PMT) associated with the stream media content, or a program association table (PAT) associated with the stream media content.

19. The non-transitory computer readable medium of claim 17, wherein the one or more operations for the sending a DLNA HTTP response cause the second metadata to include information enabling construction of a HTTP Live Streaming (HLS) master playlist.

20. The non-transitory computer readable medium of claim 17, wherein the one or more operations for the sending a DLNA HTTP response cause the second metadata to include the stream media content information in base64 format.

21. The non-transitory computer readable medium of claim 17, wherein the one or more operations are configured such that the DLNA HTTP response header is provided as at least part of a programinfo.dlna.org parameter, and the DLNA HTTP request header is provided as at least a getprograminfo.dlna.org parameter.

* * * * *